E. J. DE NORMANVILLE.
VARIABLE VELOCITY RATIO GEARING.
APPLICATION FILED MAY 14, 1921.
1,383,988.
Patented July 5, 1921.
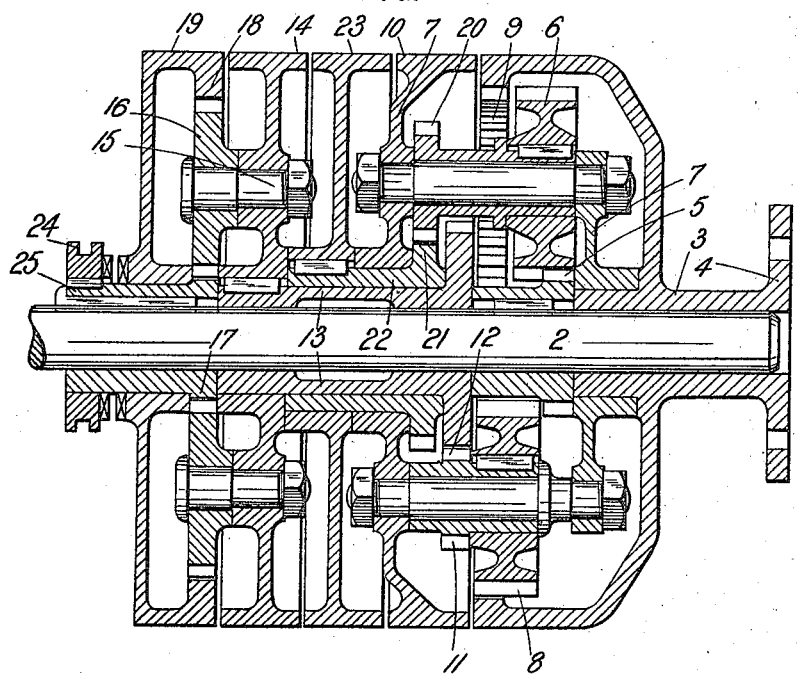
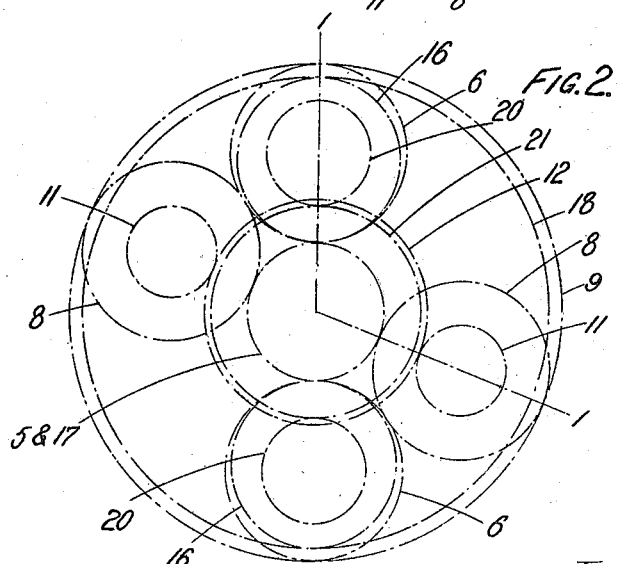
INVENTOR
Edgar J. de Normanville

UNITED STATES PATENT OFFICE.

EDGAR JOSEPH DE NORMANVILLE, OF LONDON, ENGLAND.

VARIABLE VELOCITY-RATIO GEARING.

1,383,988.   Specification of Letters Patent.   Patented July 5, 1921.

Application filed May 14, 1921. Serial No. 469,683.

*To all whom it may concern:*

Be it known that I, EDGAR JOSEPH DE NORMANVILLE, a subject of the King of Great Britain, residing at London, England, have invented new and useful Improvements in Variable Velocity - Ratio Gearing, for which I have filed an application in Great Britain, No. 29,477, dated Nov. 26, 1919, of which the following is a specification.

This invention relates to improvements in variable velocity ratio gearing of the kind comprising epicyclic trains which can be selectively put into operation by brakes arranged to act upon and prevent rotation of appropriate members, and the said invention more particularly relates to such gearing comprising primary and secondary planet wheels mounted in the same frame and in gear one with the other, the primary planet wheel being also in gear with a sun wheel which is a driving member, and the secondary planet wheel being in gear with an internally toothed wheel which is the driven member of the gearing.

Variable velocity ratio gearing of this kind has heretofore been proposed wherein the secondary planet wheel is in gear with a sun wheel which can alternatively be held stationary by a brake or clutched to the driving member to rotate with the latter; and in this gearing the primary planet wheel is provided with a compounding planet wheel in gear with another sun wheel which can be held stationary by a brake or set free to rotate idly.

According to this invention, in variable velocity ratio gearing of the kind hereinabove referred to, the said sun wheel which is provided with means for holding it stationary or clutching it to the driving member, is provided with additional means whereby it can be rotated at a speed different from that of the driving member. For this purpose this sun wheel is carried by a sleeve which also carries a brake drum and a planet wheel in gear with an internally toothed wheel the rotary movement of which can be arrested by a brake and in gear with a sun wheel rotating with the driving member, a clutch being provided for locking together the said internally toothed wheel and sun wheel last mentioned. In order that the velocity ratio of the several trains may not be limited by the ratio of the diameter of the secondary planet wheel to the diameter of the path around which the axis of this wheel moves, the secondary planet wheel is provided with a compounding wheel in gear with the sun wheel which can be held stationary or positively rotated, so that the ratio of the diameters of this sun wheel and compounding wheel can be varied without effecting other parts of the gearing.

Referring to the accompanying drawings:—

Figure 1 is a longitudinal sectional view of variable velocity ratio gearing constructed according to this invention, the planes of section being indicated by the lines 1—1, Fig. 2.

Fig. 2 is a diagram showing the pitch circles of the toothed wheels shown in Fig. 1.

As shown in this drawing, 2 is a shaft operating as the driving member, and 3 is a sleeve rotatable on the shaft 2 and operating as the driven member. This sleeve is shown provided with a coupling flange 4. The shaft 2 has a toothed wheel 5 keyed thereon in gear with and acting as the sun wheel of a primary planet wheel 6, carried by a frame comprising end members 7, 7 rotatable around the said driving shaft. The said frame also carries a secondary planet wheel 8, in gear with the primary planet wheel, (see Fig. 2), and also with an internally toothed wheel 9 formed integrally with the sleeve 3. With this arrangement by applying a brake to a drum 10 and thereby arresting rotation of the frame 7, the driven member 3 is rotated in the same direction as the driving shaft 2 and at a reduced speed.

To obtain a quicker rotation of the driven member 3 in the same direction as the driving shaft, the secondary planet wheel 8 is provided with a compounding wheel 11 in gear with a sun wheel 12 carried by a sleeve 13 on the driving shaft, this sleeve being provided with a brake drum 14 so that the said sun wheel 12 can be held stationary.

To obtain a still quicker rotation of the driven member in the same direction as the driving shaft, the said brake controlled sun wheel 12 which in the previous instance was held stationary, has an additive movement communicated thereto by the spindle 15 of a planet wheel 16 in gear with a second sun wheel 17 keyed on the driving shaft. To put this planet wheel 16 which is in gear with the said second driving shaft sun wheel 17 into operation, it is arranged to gear with an internally toothed wheel 18 provided on a brake drum 19 which can be held stationary and thus cause the planet wheel 16 to travel around the same.

When it is desired to drive the driven member 3 at the same speed as the driving member 2 of the gearing, parts of the gearing are locked together in the usual way for this type of gear so that they can rotate as a whole with the driving member carrying the driven member with them. For example, this can be done by locking one of the brake controlled members to the driving member or shaft 2. As shown a clutch 24 is provided to lock the drum 19 to a sleeve forming an extension of the sun wheel 17 which is keyed to the shaft 2.

There are thus obtained four speeds of the driven member in progressively increasing ratio, in the same direction as the driving shaft.

To obtain a rotation at a reduced or slow speed in the opposite direction to the rotation of the driving shaft, the primary planet wheel 6 above mentioned is provided with a compounding wheel 20 in gear with a corresponding sun wheel 21 carried by a sleeve 22 which can be held at rest by means of a suitably arranged brake drum 23.

In the arrangement shown, the planetary wheels are duplicated but one or any other convenient number of sets of planetary wheels may be provided.

I claim:—

1. Variable velocity ratio gearing for transmitting motion from a driving shaft to a driven member, comprising in combination, primary and secondary planet wheels mounted on the same frame and in gear one with the other, a sun wheel fast on the driving shaft and in gear with the primary planet wheel, an internally toothed wheel fast with the driven member and in gear with the secondary planet wheel, a sleeve rotatably mounted on the driving shaft, a second sun wheel fast on this sleeve and geared to the secondary planet wheel, a controlling planet wheel carried by the said sleeve, a brake drum, an internally toothed wheel carried by the brake drum, and a third sun wheel fast on the driving shaft, the internally toothed wheel carried by the brake drum and the third sun wheel both being in gear with the said controlling planet wheel.

2. Variable velocity ratio gearing for transmitting motion from a driving shaft to a driven member, comprising in combination, primary and secondary planet wheels mounted on the same frame and in gear one with the other, a sun wheel fast on the driving shaft and in gear with the primary planet wheel, an internally toothed wheel fast with the driven member and in gear with the secondary planet wheel, a sleeve rotatably mounted on the driving shaft, a second sun wheel fast on this sleeve, a compounding wheel gearing the said second sun wheel to the secondary planet wheel, a controlling planet wheel carried by the said sleeve, a brake drum, an internally toothed wheel carried by the brake drum, and a third sun wheel fast on the driving shaft, the internally toothed wheel carried by the brake drum and the third sun wheel both being in gear with the said controlling planet wheel.

3. Variable velocity ratio gearing for transmitting motion from a driving shaft to a driven member, comprising in combination, primary and secondary planet wheels mounted on the same frame and in gear one with the other, a sun wheel fast on the driving shaft and in gear with the primary planet wheel, an internally toothed wheel fast with the driven member and in gear with the secondary planet wheel, a sleeve rotatably mounted on the driving shaft, a second sun wheel fast on this sleeve and geared to the secondary planet wheel, a controlling planet wheel carried by the said sleeve, a brake drum, an internally toothed wheel carried by the brake drum, a third sun wheel fast on the driving shaft, the internally toothed wheel carried by the brake drum and the third sun wheel both being in gear with the said controlling planet wheel, and a clutch between the said brake drum and the third sun wheel.

4. Variable velocity ratio gearing for transmitting motion from a driving shaft to a driven member, comprising in combination, primary and secondary planet wheels mounted on the same frame and in gear one with the other, a sun wheel fast on the driving shaft and in gear with the primary planet wheel, an internally toothed wheel fast with the driven member and in gear with the secondary planet wheel, a sleeve rotatably mounted on the driving shaft, a second sun wheel fast on this sleeve and geared to the secondary planet wheel, a controlling planet wheel carried by the said sleeve, a brake drum, an internally toothed wheel carried by the brake drum, a third sun wheel fast on the driving shaft, the internally toothed wheel carried by the brake drum and the third sun wheel both being in gear with the said controlling planet wheel, and a second brake fast on the said sleeve.

5. Variable velocity ratio gearing for transmitting motion from a driving shaft to a driven member, comprising in combination, primary and secondary planet wheels mounted on the same frame and in gear one with the other, a sun wheel fast on the driving shaft and in gear with the primary planet wheel, an internally toothed wheel fast with the driven member and in gear with the secondary planet wheel, a sleeve rotatably mounted on the driving shaft, a second sun wheel fast on this sleeve and geared to the secondary planet wheel, a controlling planet wheel carried by the said sleeve, a brake drum, an internally toothed wheel carried by the brake drum, a third sun wheel fast on the driving shaft, the internally toothed wheel carried by the brake drum and the third sun wheel both being in gear with the said controlling planet wheel, a brake drum on the frame carrying the primary and secondary planet wheels, and a brake fast with a sun wheel geared to the primary planet wheel.

EDGAR JOSEPH de NORMANVILLE.

Witnesses:
 HERBERT A. BEESTON,
 G. A. HUGHES.